United States Patent Office 2,812,409
Patented Nov. 5, 1957

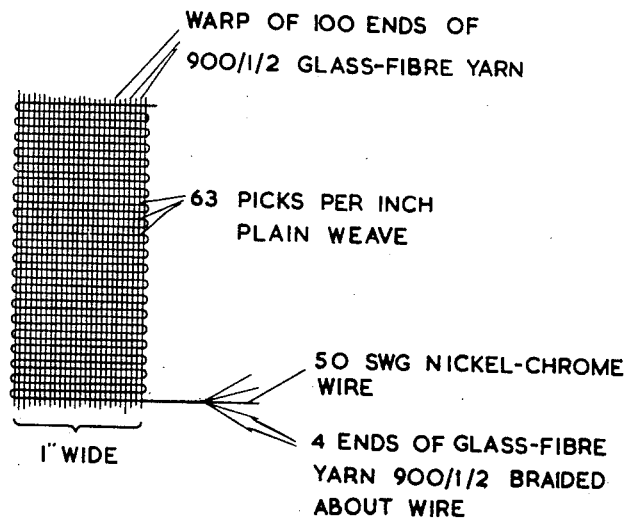

2,812,409

ELECTRIC STRAIN GAUGES

Horace Jones, Long Eaton, Nottingham, and Joseph Rowland Wylde, Spondon, near Derby, England; said Wylde assignor to British Celanese Limited, a corporation of Great Britain Application November 13, 1952, Serial No. 320,212

Claims priority, application Great Britain July 2, 1952

4 Claims. (Cl. 201—63)

This invention relates to strain gauges, and particularly to strain gauges of the type comprising a resistance wire which is adapted to be secured to the surface of an article to be tested so as to be strained therewith and so that the degree of strain of the article can be assessed by observing the variation in electrical resistance of the wire caused by the straining of the wire.

According to the present invention a strain gauge of the type referred to is in the form of a woven ribbon of which the weft comprises a resistance wire while the warp consists of glass-fibre yarns, said gauge consisting wholly of wire and other heat-refractory material. A strain gauge consisting of a short length of such a ribbon can be fixed to the surface of the article to be tested by means of a suitable heat-resisting cement, and can be effectively used as a strain gauge even though the temperature of the surface should rise to a high temperature, e. g. of the order of 400° C. or considerably more. The present invention thus provides a preformed strain gauge which is relatively inexpensive to make, can be always available for use when required and can be cemented into place and used with far less trouble and expense than a strain gauge which is shaped by hand, as on a jig, and must be held to shape, e. g. by the same jig, while it is cemented in place on the article. Preformed strain gauges in the form of a woven mat or ribbon having a warp of textile material and a weft comprising a resistance wire, whether with or without a stiffening or reinforcement of textile or other material, are quite unsuitable for use at high temperatures since the decomposition of the textile material at the temperatures involved interferes with the satisfactory adhesion between the resistance wire and the articles to be tested.

A preferred form of the invention is shown by way of example in the accompanying drawing, which is a diagramfatic face view of a woven ribbon of which suitable lengths can be used as strain gauge elements.

The weft in the strain gauge of the present invention may be in the form of bare wire, the heat-resisting cement used for fastening it to the article being tested being relied on to insulate the wire electrically from the surface of the article. Though considerable difficulties are apt to arise in the weaving into a ribbon of a wire of the requisite fineness, these difficulties can be overcome, if necessary, by thickening or reinforcing the wire by a covering of a material which can be removed from the strain gauge after weaving so as to leave it free from material liable to decompose under heat. Thus the wire may be covered with a lapping of cellulose acetate yarn to facilitate the weaving operation, which yarn may be dissolved from the woven ribbon or from a length of such ribbon to be used as a strain gauge by means of acetone. Alternatively, however, the wire may be augmented or thickened by a covering or reinforcement of a heat-refractory material, either a coating of heat resisting cement or enamel or (and preferably) a covering of glass-fibre yarn, which remains in the strain gauge as an integral part thereof.

In the preferred form, in which the wire is reinforced with a covering of glass-fibre yarn, if the wire is too fine to be lapped with the yarn by reason of the sharp angle round which the yarn must be drawn to lap the wire and the brittle tendency of the glass-fibres, the covering of the wire can be still effected by braiding a plurality of yarns round the wire. The yarns are passed helically round the wire, some in one direction and some in the other, and are interlaced with one another to form a coherent covering. The simplest form of braiding is one made from 4 ends of glass-fibre yarn, 2 ends passing helically round the wire in each direction, and each end passing always outside one of the two yarns passing in the other direction and inside the other of those yarns.

In order to achieve the requisite fineness in the yarns employed, it is desirable to use yarns, both in the warp and for covering the wire, in which the glass fibres are substantially continuous filaments. The use of fine yarns, giving a ribbon of very small thickness, enables the wire to be positioned, when the strain gauge is in use, very close to the surface of the article to be tested, so that the strains imposed on the wire faithfully reproduce those experienced by the material of the article at the surface thereof. For the same reason inter alia it is advantageous to use wire of very fine gauge. While coarser wires can be used it is desirable to use wires of at least 44 S. W. G. (0.0032" diameter) and preferably of 50 S. W. G. (0.001" diameter) or even finer. Gauges have been prepared from wires of a diameter of 0.0005". The material of the wire may be any suitable known material having the requisite electrical properties, and the ability to be drawn into wire of the requisite fineness, and capable of withstanding the high temperature conditions to which the gauge is to be subjected. Nickel/chrome alloys are very suitable as combining a high specific resistance, a low temperature coefficient, and the ability to be drawn to a very fine gauge.

While the strain gauge according to the invention consists wholly of wire and other refractory material, the woven ribbon from which the gauge is made may comprise a content of other material, which is removed when the ribbon is divided to form separate strain gauges. Thus, as described in specification British Patent No. 623,641, May 20, 1949, the ribbon may be woven in sections so as to be separable into units of predetermined resistance, the wire-containing picks of each unit being separated from those of the adjacent unit by a few picks of cotton or other removable yarn. Again, as described in that specification, two or more wire-containing picks at the end of each unit may be isolated by picks of cotton or other material from the main body of the unit, for the purpose of being unravelled from the warp and serving as a connecting lead to the strain gauge. Again, as described in specification British Patent No. 647,377, December 13, 1950, the ribbon may be woven in sections at each end of which a projecting loop of the wire-containing weft is formed at the edge of the ribbon to serve as a connecting lead.

The strain gauge ribbon shown in the drawings is woven from a warp having a width of 1" and consisting of 100 ends of glass-fibre yarn each of gauge 900/½, i. e. consisting of two singles ends each containing about 100 continuous filaments and each having a count, in hanks (of 100 yards) per lb. of 900, the two ends being doubled together with low twist. The weft employed comprises a core of nickel/chrome wire of 50 S. W. G. (0.001" diameter) round which have been braided 4 ends of the same glass-fibre yarn as is used in the warp, two ends of the twofold yarn passing in one direction and 2 in the other, each end passing round the wire 20 turns per inch length. The weft is woven at 63 picks per inch plain weave, to give a ribbon 1" in width.

It is to be understood that the foregoing detailed description is given merely by way of illustration and that variations may be made therein without departing from the spirit of the invention.

Having described our invention, what we desire to secure by Letters Patent is:

1. A strain gauge in the form of a woven ribbon having a weft consisting of a resistance wire of a diameter of at most 0.00032" reinforced by a braided covering therefor of glass-fibre yarn passed helically around said wire, and having a warp consisting of glass-fibre yarns, said gauge consisting wholly of wire and other heat-refractory materials resistant to a temperature of at least 400° C.

2. A strain gauge in the form of a woven ribbon having a weft consisting of a resistance wire of a diameter of at most 0.001" reinforced by a covering therefor braided from yarns of continuous filaments of glass passed helically around said wire, and having a warp consisting of yarns of continuous filaments of glass, said gauge consisting wholly of wire and other heat-refractory materials resistant to a temperature of at least 400° C.

3. A strain gauge in the form of a woven ribbon consisting wholly of a warp and a weft, said weft consisting of a nickel/chrome resistance wire of a diameter of 0.001" reinforced by a covering therefor braided from four continuous filament glass-fibre yarns each of gauge 900/½, said warp consisting of continuous filament glass-fibre yarns each of gauge 900/½.

4. A strain gauge in the form of a woven ribbon consisting wholly of a warp and a weft, said weft consisting of a nickel/chrome resistance wire of a diameter of 0.001" reinforced by a covering therefor braided from four continuous filament glass-fibre yarns each of gauge 900/½ and being woven at 63 picks per inch plain weave, said warp consisting of continuous filament glass-fibre yarns each of gauge 900/½ spaced at 100 ends per inch.

References Cited in the file of this patent

UNITED STATES PATENTS

| | | |
|---|---|---|
| 2,292,549 | Simmons | Aug. 11, 1942 |
| 2,511,540 | Osterheld | June 13, 1950 |